(12) United States Patent
Nakao et al.

(10) Patent No.: US 10,962,896 B2
(45) Date of Patent: Mar. 30, 2021

(54) LIGHT SCANNING DEVICE AND IMAGE FORMING APPARATUS INCLUDING THE SAME

(71) Applicant: SHARP KABUSHIKI KAISHA, Sakai (JP)

(72) Inventors: Atsuo Nakao, Sakai (JP); Takaharu Motoyama, Sakai (JP); Hiroshi Yamamoto, Sakai (JP); Reishi Aoki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/869,136

(22) Filed: May 7, 2020

(65) Prior Publication Data

US 2020/0356022 A1 Nov. 12, 2020

(30) Foreign Application Priority Data

May 10, 2019 (JP) .............................. JP2019-089915
May 10, 2019 (JP) .............................. JP2019-089916

(51) Int. Cl.
*G03G 15/04* (2006.01)
*G02B 26/12* (2006.01)
*G02B 26/10* (2006.01)
*G02B 26/08* (2006.01)

(52) U.S. Cl.
CPC ... *G03G 15/04036* (2013.01); *G02B 26/0816* (2013.01); *G02B 26/101* (2013.01); *G02B 26/12* (2013.01)

(58) Field of Classification Search
None
See application file for complete search history.

(56) References Cited

U.S. PATENT DOCUMENTS

| 6,473,105 B1 | 10/2002 | Tanaka et al. |
| 10,425,551 B2 * | 9/2019 | Kuribayashi .......... H04N 1/113 |
| 2008/0019255 A1 | 1/2008 | Imai et al. |
| 2011/0063703 A1 * | 3/2011 | Ishibe .................. G02B 26/123 |
| | | 359/204.1 |

FOREIGN PATENT DOCUMENTS

| JP | 2001-201707 A | 7/2001 |
| JP | 2008-076506 A | 4/2008 |

* cited by examiner

*Primary Examiner* — Roy Y Yi
(74) *Attorney, Agent, or Firm* — ScienBiziP, P.C.

(57) ABSTRACT

An optical scanning device includes: a polygon mirror deflecting light beams; and a plurality of reflective mirrors reflecting the light beams so as to guide the light beams to respective photosensitive drums. A first fθ lens is provided on an optical path of the light beam from the polygon mirror to a first reflective mirror. The optical path of the light beam reflected by a third reflective mirror crosses the optical path between the first reflective mirror and a second reflective mirror.

18 Claims, 10 Drawing Sheets

LIGHT SCANNING DEVICE AND IMAGE FORMING APPARATUS INCLUDING THE SAME

CROSS-REFERENCE TO RELATED APPLICATIONS

This application claims priority under 35 U.S.C. § 119 (a) on Patent Application No. 2019-089915 and Patent Application No. 2019-089916 both filed in Japan on May 10, 2019, the entire contents of which are herein incorporated by reference.

FIELD OF THE INVENTION

A color image forming apparatus using an electrophotographic method uniformly charges the surfaces of respective photosensitive bodies (respective scan objects) corresponding to a plurality of colors and then scans the respective photosensitive body surfaces with respective light beams so as to form respective electrostatic latent images on the respective photosensitive body surfaces. The color image forming apparatus develops the electrostatic latent images on the respective photosensitive body surfaces using respective colors of toner to form toner images in the respective colors on the respective photosensitive body surfaces. The color image forming apparatus superimposes and transfers the toner images in the respective colors from the respective photosensitive bodies to an intermediate transfer body so as to form a color toner image on the intermediate transfer body, and then transfers this color toner image from the intermediate transfer body to a recording sheet.

The respective photosensitive bodies are scanned with the respective light beams by an optical scanning device. Typically, four colors, which are black, cyan, magenta, and yellow, of toner are used. Accordingly, it is necessary to scan four photosensitive bodies using at least four light beams.

Nowadays, there is a demand for downsizing and thinning of the image forming apparatus, which leads to necessity of a downsized and thinned optical scanning device. For example, in an optical scanning device described in JP 2001-201707 A, a plurality of reflective mirrors is disposed in respective optical paths of light beams from a deflecting section, and furthermore fθ lenses are provided respectively on the optical paths of the light beams from the reflective mirrors.

Also, in an optical scanning device described in JP 2008-076506 A, two scanning lenses are disposed between a deflecting section and a reflective mirror positioned closest to the deflecting section. This type of optical scanning device has a configuration in which respective light beams emitted from a light source are reflected by the deflecting section so as to be assigned with respective optical systems. The respective optical systems cause the respective light beams to enter the respective photosensitive bodies.

In the conventional optical scanning devices, a plurality of reflective mirrors, which divides light beams into respective colors, is disposed at certain intervals in a sub-scanning direction, and furthermore is disposed at certain intervals in a rotation axis direction of the deflecting section, so that they do not superimpose on each other. Such a manner of disposition of the plurality of reflective mirrors requires the thickness of the optical scanning device in a height direction, which may affect downsizing and thinning of the optical scanning device. Also, since the second scanning lens is disposed upstream of the reflective mirror, the manner of disposition of the plurality of reflective mirrors is limited, which may degrade flexibility in design.

SUMMARY OF THE INVENTION

The present invention was made in consideration of the above circumstances, an object of which is to provide: an optical scanning device that is capable of dividing, by a plurality of reflective mirrors, light beams reliably into respective optical systems and that can be suitably downsized and thinned; and an image forming apparatus including the above-described optical scanning device.

In order to solve the above problem, one embodiment of the present invention pertains to an optical scanning device deflecting a light beam emitted from a light source and scanning scan objects with the light beam. The optical scanning device includes: the light source; a deflecting section deflecting the light beam emitted from the light source; at least three reflective mirrors reflecting the light beam deflected by the deflecting section so as to guide the light beam to a specific one of the scan objects; and a first optical member that has condensing characteristics and that is provided on an optical path of the light beam from the deflecting section to one of the at least three reflective mirrors. When the at least three reflective mirrors are set as a first reflective mirror, a second reflective mirror and a third reflective mirror in this order from an upstream side of the optical path of the light beam, the first reflective mirror, the second reflective mirror and the third reflective mirror are positioned such that the optical path of the light beam reflected by the third reflective mirror crosses the optical path between the first reflective mirror and the second reflective mirror.

With the above-described configuration, regarding the optical path of the light beam that is deflected by the deflecting section and is further reflected by the plurality of reflective mirrors so as to be guided to the scan object, it is possible to sufficiently maintain the length of the optical path while compactly disposing and installing the plurality of reflective mirrors in the housing.

Also in the above-described optical scanning device, a fourth reflective mirror may be provided on the optical path of the light beam. The fourth reflective mirror receives the light beam reflected by the third reflective mirror. In this case, it is preferable that the first reflective mirror and the third reflective mirror are disposed on the side of the specific scan object relative to a reference plane while the second reflective mirror and the fourth reflective mirror are disposed on the side opposite to the specific scan object relative to the reference plane.

Another embodiment of the present invention pertains to an optical scanning device deflecting a light beam emitted from a light source and scanning scan objects with the light beam. The optical scanning device includes: the light source; a deflecting section deflecting the light beam emitted from the light source; a plurality of reflective mirrors reflecting the light beam deflected by the deflecting section so as to guide the light beam to a specific one of the scan objects; and a first optical member that has condensing characteristics and that is provided on an optical path of the light beam from the deflecting section to a first reflective mirror among the plurality of reflective mirrors. The plurality of reflective mirrors is positioned such that the optical path of the light beam from a second reflective mirror disposed downstream of the first reflective mirror on the optical path of the light beam to the specific scan object crosses the optical path of the light beam from the deflecting section to the first optical member.

With the above-described configuration, regarding the optical path of the light beam that is deflected by the deflecting section and is further reflected by the plurality of reflective mirrors so as to be guided to the scan object, it is possible to sufficiently maintain the length of the optical path while compactly disposing and installing the plurality of reflective mirrors in the housing.

Also, an image forming apparatus including the optical scanning device having the above-described configuration is in the range of the technical idea of the present invention. That is, the image forming apparatus includes the optical scanning device, and forms latent images respectively on the scan objects by the optical scanning device, develops the latent images on the scan objects as visible images, and transfers the visible images from the scan objects to a sheet to form an image on the sheet.

With the above-described configuration, further downsizing and thinning of the optical scanning device is possible, which leads to realization of a downsized image forming apparatus while providing high quality images.

DESCRIPTION OF THE PREFERRED EMBODIMENTS

Hereinafter, an optical scanning device 10 and an image forming apparatus 1 according to the Embodiments of the present invention will be described with reference to the drawings.

Image Forming Apparatus

Figure 1:
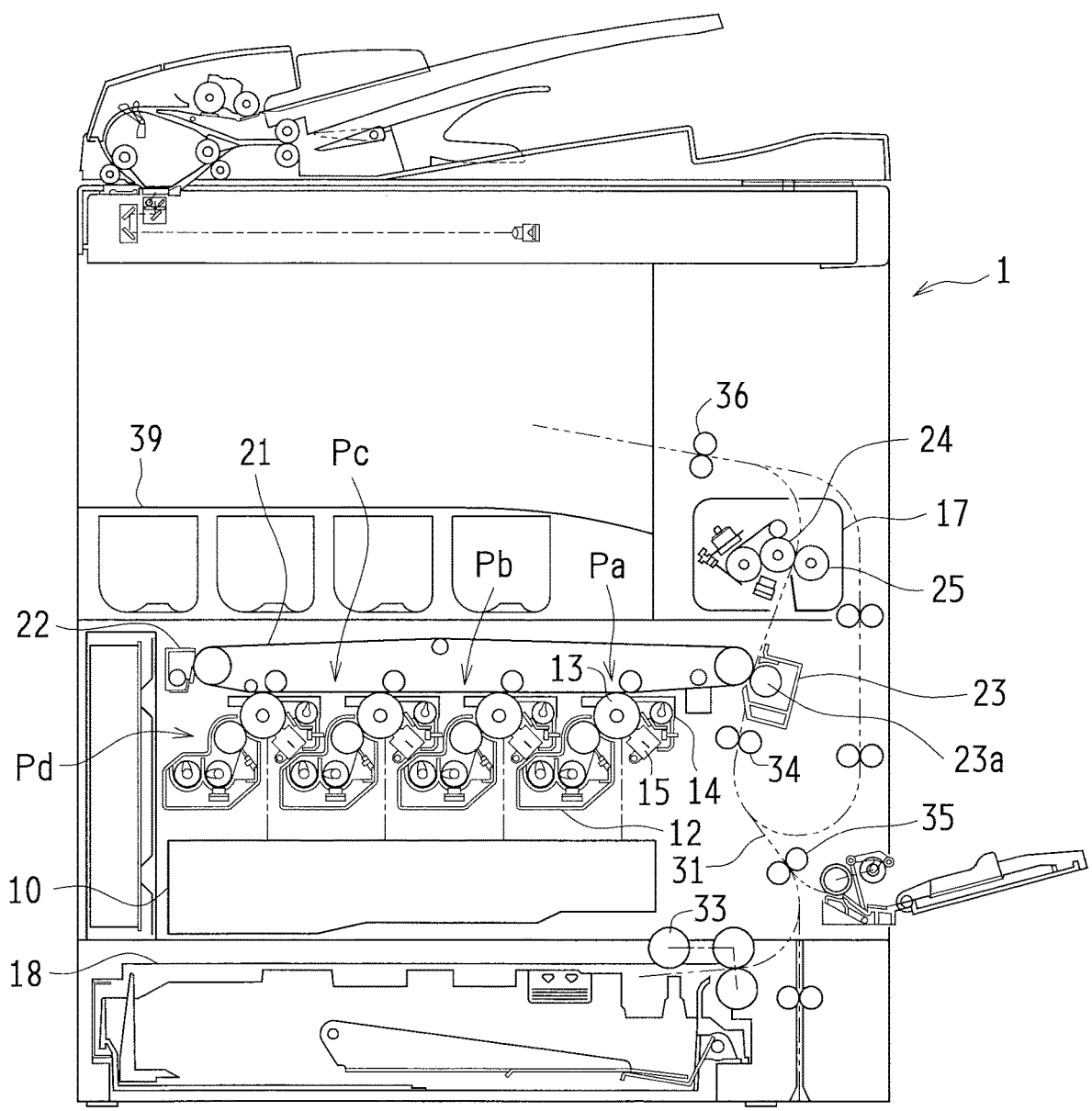
FIG. 1 is a cross-sectional view illustrating an image forming apparatus including an optical scanning device of the present invention.

FIG. 1 is a cross-sectional explanatory diagram illustrating the image forming apparatus 1 including the optical scanning device 10 of the present invention. Image data handled by the image forming apparatus 1 corresponds to a color image using respective colors of black (K), cyan (C), magenta (M), and yellow (Y), or corresponds to a monochrome image using a single color (for example, black).

In this example, the image forming apparatus 1 includes four development apparatuses 12, four photosensitive drums 13 as scan objects, four drum cleaning apparatuses 14, four charger 15, and four each of similar apparatuses so as to form four types of toner images according to the respective colors. Each of the four components corresponds to black (K), cyan (C), magenta (M), and yellow (Y). Thus, four image stations Pa, Pb, Pc, and Pd are constituted.

In each of the image stations Pa, Pb, Pc, and Pd, the drum cleaning device 14 removes and recovers residual toner on the surface of the photosensitive drum 13. Then, the charger 15 uniformly charges the surface of the photosensitive drum 13 at a predetermined electric potential. The optical scanning device 10 exposes the surfaces of the photosensitive drums 13 to form electrostatic latent images on the surfaces thereof. Then, the development devices 12 develop respectively the electrostatic latent images on the surfaces of the photosensitive drums 13 so as to form toner images on the surfaces of the photosensitive drums 13. The respective development devices 12 visualize the latent images formed on the respective surfaces of the photosensitive drums 13 in four toners respectively corresponding to four colors (K, C, M and Y). Thus, the toner images in respective colors are formed on the surfaces of the respective photosensitive drums 13.

Sequentially, after residual toner on an intermediate transfer belt 21 is removed and recovered by a belt cleaning device 22 while the intermediate transfer belt 21 is moved circularly, the toner image in each color formed on the surface of the corresponding photosensitive drum 13 is sequentially transferred on the intermediate transfer belt 21. Thus, the toner images are superimposed to each other to form a color toner image on the intermediate transfer belt 21.

A nip region is formed between the intermediate transfer belt 21 and a transfer roller 23a of a secondary transfer device 23. The recording sheet, which has been transported via a sheet transport path 31, is further transported with being sandwiched in the nip region, and at that time, the color toner image on the surface of the intermediate transfer belt 21 is transferred on the recording sheet. Then, the recording sheet is sandwiched between a heating roller 24 and a pressure roller 25 of a fixing device 17 so as to be heated and pressurized. Thus, the color toner image is fixed on the recording sheet.

Meanwhile, the recording sheet is drawn from a sheet feed cassette 18 by a pickup roller 33 and transported via the sheet transport path 31 so as to pass through the secondary transfer device 23 and the fixing device 17. Finally, the recording sheet is discharged to a discharge tray 39 via discharge rollers 36. The sheet transport path 31 is provided with registration rollers 34, the transport rollers 35 and the like. The registration rollers 34 temporarily stop the recording sheet so as to arrange the leading edge thereof, and start to transport the recording sheet at a timing when the toner image is transferred in the nip region between the intermediate transfer belt 21 and the transfer roller 23a. The transport rollers 35 allow the recording sheet to be transported.

Embodiment 1

A description will be given on the optical scanning device 10 according to Embodiment 1, which is included in the image forming apparatus 1, with reference to FIGS. 2 to 5. As shown in FIG. 3 and the like, the direction perpendicular to a main-scanning direction Y is set as a sub-scanning direction X, and the direction perpendicular to the main-scanning direction Y and also to the sub-scanning direction X (i.e. the longitudinal direction of a rotation center axis G of a polygon motor 53) is set as a height direction Z.

The optical scanning device 10 includes a housing 41. The housing 41 includes: a rectangular-shaped upper lid 42; a bottom plate 43; and four side plates 44 surrounding the bottom plate 43. The housing 41 is closed by the upper lid 42 to prevent dust from entering the housing 41. The optical scanning device 10 guides light beams 52 emitted from a plurality of light-emitting elements (semiconductor lasers) 51 serving as a light source to reflecting surfaces of the polygon mirror 53. Thus, the light beams 52 are reflected by the reflecting surfaces of the polygon mirror 53 to be deflected.

The reflected light beams 52 are guided to the respective photosensitive drums 13 by the optical members disposed in the housing 41. The optical scanning device 10 has a configuration in which the photosensitive drums 13 are scanned with the respective light beams 52.

Figure 2:
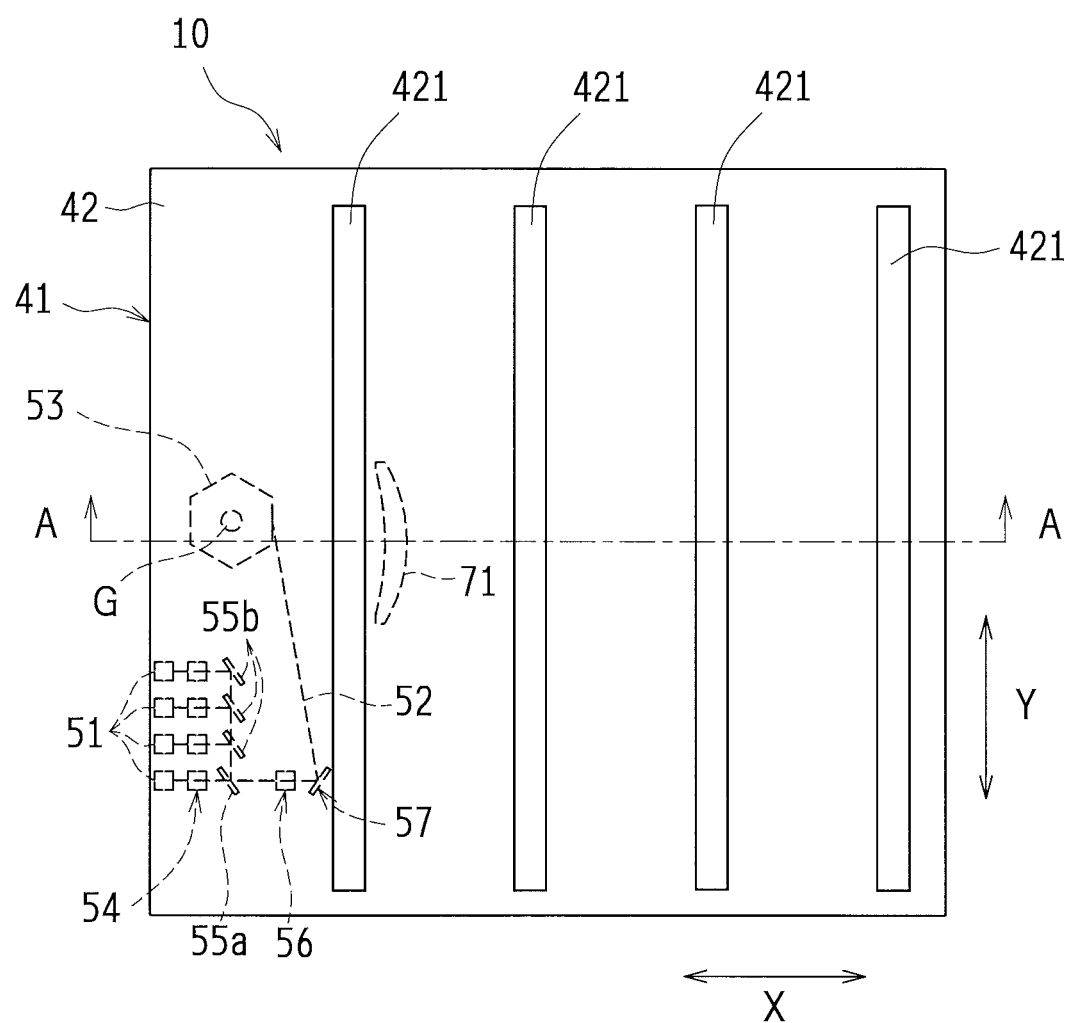
FIG. 2 is a top view illustrating the optical scanning device of the present invention.
Figure 3:
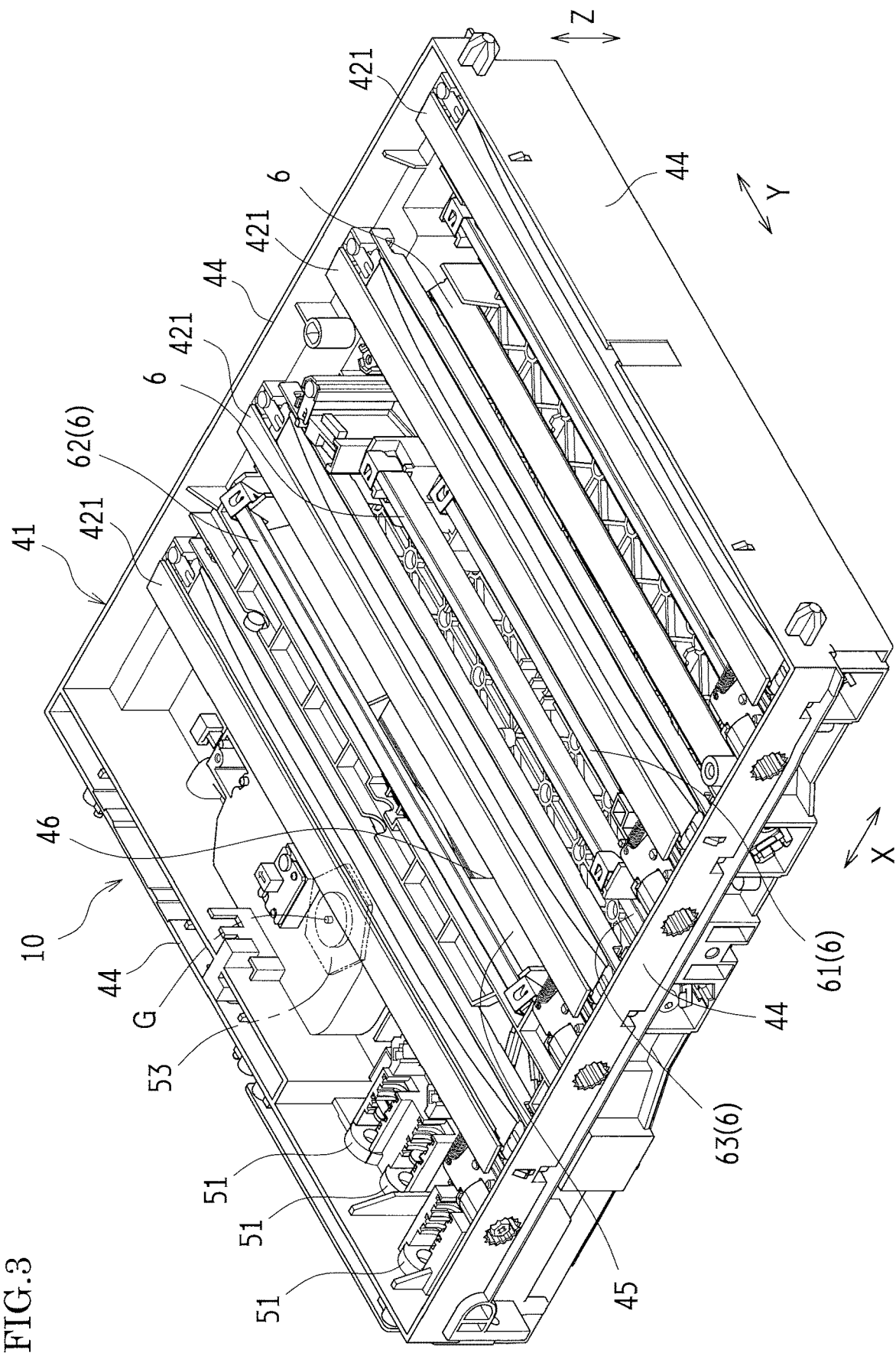
FIG. 3 is a perspective view illustrating the inside of a housing of the optical scanning device according to Embodiment 1, with an upper lid of the housing being removed.

As shown in FIG. 2, in the space from the respective light-emitting elements 51 to the polygon mirror 53, the optical scanning device 10 is provided with four collimator lenses 54, four first mirrors 55a/55b, a cylindrical lens 56 and a second mirror 57 in this order on the optical paths from the light-emitting elements 51 to the polygon mirror 53.

The collimator lenses 54 convert the light beams 52 emitted from the light-emitting elements 51 into parallel lights. The three first mirrors 55b reflect the respective light beams 52 emitted from three of the light-emitting elements 51 via the respective collimator lenses 54 to one first mirror 55a. The one first mirror 55a reflects the respective light beams 52 reflected by the three first mirrors 55b to the cylindrical lens 56. The light beam 52 that is emitted from the remaining one of the light-emitting elements 51 and that passes through the collimator lens 54 passes over the first mirror 55a to enter the cylindrical lens 56.

The cylindrical lens 56 condenses the light beams 52 in the sub-scanning direction X and substantially converges the light beams 52 in the vicinity of or on the reflecting surface of the polygon mirror 53 while the spot of the light beams 52 is focused on or on the vicinity of the reflecting surface of the polygon mirror 53. Also, the cylindrical lens 56 simply emit, in the main-scanning direction Y perpendicular to the sub-scanning direction X, the light beams 52 as the parallel lights.

The polygon mirror 53 corresponds to a deflecting section (rotating polygon mirror), which is rotated at a high speed about a rotation center axis G. The polygon mirror 53 reflects the light beams 52 on the respective reflecting surfaces so as to repeatedly deflect the light beams 52 in the main-scanning direction Y. A plurality of reflective mirrors 6 is provided on the optical paths of the light beams 52 reflected by the polygon mirror 53 so as to guide the deflected light beams 52 by the polygon mirror 53 to the respective photosensitive drums 13.

Figure 4:
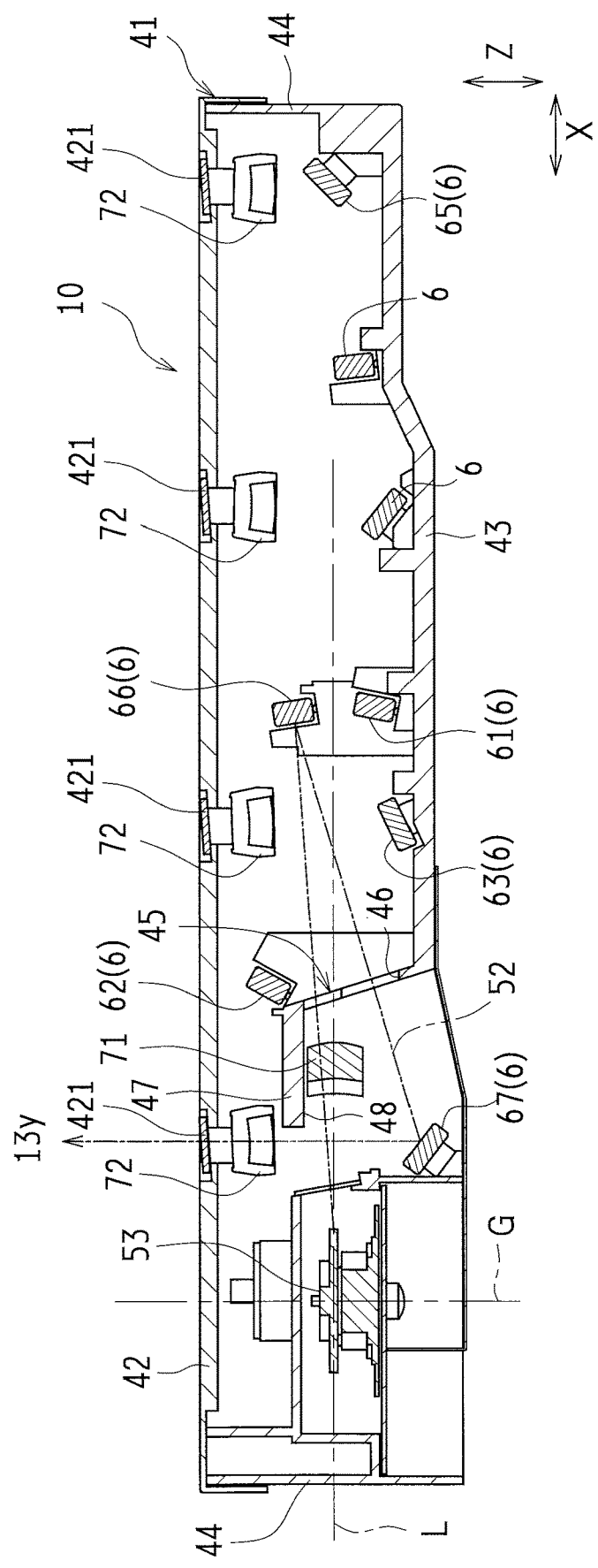
FIG. 4 is an explanatory diagram illustrating an arrangement of optical members of the optical scanning device according to Embodiment 1, which is taken from line A-A of FIG. 2.

As shown in FIG. 4, the optical scanning device 10 according to Embodiment 1 is provided with a first fθ lens 71 as a first optical member, the plurality of reflective mirrors 6, and four second fθ lenses 72 as a second optical member, in this order on the optical paths from the polygon mirror 53 to the respective photosensitive drums 13.

The plurality of reflective mirrors 6 reflects the entering light beams 52 to the respective photosensitive drums 13.

The upper lid 42 includes dustproof windows 421 that pass the reflected light beams 52. Each dustproof window 421 includes, for example, transparent glass and closes a corresponding opening of the upper lid 42. The respective light beams 52 that pass through the corresponding dustproof window 421 form images on the respective photosensitive drums 13 (see FIG. 5).

As shown in FIG. 4, on an optical path of the light beam 52 to the photosensitive drum 13 (13y) for yellow color (Y) among the plurality of optical paths, the optical scanning device 10 includes a first reflective mirror 66 and a second reflective mirror 67 that receives the light beam 52 reflected by the first reflective mirror 66, in this order on the optical path from the polygon mirror 53 to the photosensitive drum 13y for yellow color.

When the plane that is orthogonal to the rotation center axis G of the polygon mirror 53 and that equally divides each of the reflecting surfaces of the polygon mirror 53 is set as a reference plane L, the first reflective mirror 66 is disposed on the side of the photosensitive drum 13y for yellow color relative to the reference plane L. Alternatively, the reference plane L may be a plane that is orthogonal to the rotation center axis G of the polygon mirror 53 and that includes the optical path of the light beam 52 to a reflective mirror 65 for black color (K), which allows the light beam 52 from the polygon mirror 53 to enter the photosensitive drum 13 for black color (K). The reflective mirror 65 for black color (K) is disposed at the farthest position from the polygon mirror 53. The second reflective mirror 67 is disposed on the side opposite to the photosensitive drum 13y for yellow color relative to the reference plane L. The first fθ lens 71 is located substantially on the reference plane L.

The polygon mirror 53 is disposed close to one side in the housing 41 in the sub-scanning direction X. The housing 41 includes an inner wall 45 erected from the bottom plate 43 toward the upper lid 42. In this example, the inner wall 45 is disposed between the first reflective mirror 66 and the second reflective mirror 67, and furthermore disposed so as to incline from the side of the first reflective mirror 66 to the side of the polygon mirror 53.

The inner wall 45 includes, at an upper end thereof, a support plate 47 that extends toward the polygon mirror 53 (in the sub-scanning direction X). The support plate 47 is disposed on the side of the photosensitive drum 13y for yellow color relative to the reference plane L. Also, the support plate 47 extends in the sub-scanning direction X within the range between the position below (but not contacting with) the second fθ lens 72 corresponding to the photosensitive drum 13y for yellow color and a second fθ lens 72 corresponding to a photosensitive drum 13m for magenta color. An upper surface of the support plate 47 faces the upper lid 42 while a rear surface 48 of the support plate 47 faces the bottom plate 43.

The first fθ lens 71 condenses and emits the light beams 52 in both the main-scanning direction Y and the sub-scanning direction X such that the light beams 52 have a predetermined beam diameter on the surfaces of the respective photosensitive drums 13. Moreover, the first fθ lens 71 transforms the light beams 52 deflected at the equal angular velocity in the main-scanning direction Y by the polygon mirror 53 such that the light beams 52 move at the equal linear velocity along the main-scanning lines on the respective photosensitive drums 13. Thus, the surfaces of the respective photosensitive drums 13 are repeatedly scanned with the light beams 52 in the main-scanning direction Y.

The plurality of reflective mirrors 6 provided on the respective optical paths reflects the light beams 52 that pass through the first fθ lens 71 such that the light beams 52 enter the respective second fθ lenses 72. The second fθ lenses 72 mainly condense the light beams 52 as parallel lights in the sub-scanning direction X such that the light beams 52 are focused, so as to respectively have predetermined beam diameters (spot diameters), on the surfaces of the respective photosensitive drums 13. Also, the second fθ lenses 72 emit the light beams 52 as converging light to the respective photosensitive drums 13 in the main-scanning direction Y.

In the optical scanning device 10, the respective light beams 52 are reflected and deflected by the reflecting surfaces of the polygon mirror 53, and then pass through the respective optical paths to enter the respective photosensitive drums 13. Thus, the surfaces of the respective photosensitive drums 13 are scanned repeatedly with the light beams 52 in the main-scanning direction. The respective photosensitive drums 13 are rotationally driven so that two-dimensional surfaces (circumference surfaces) of the respective photosensitive drums 13 are scanned with the light beams 52. Thus, respective electrostatic latent images are formed on the surfaces of the respective photosensitive drums 13.

Figure 5:
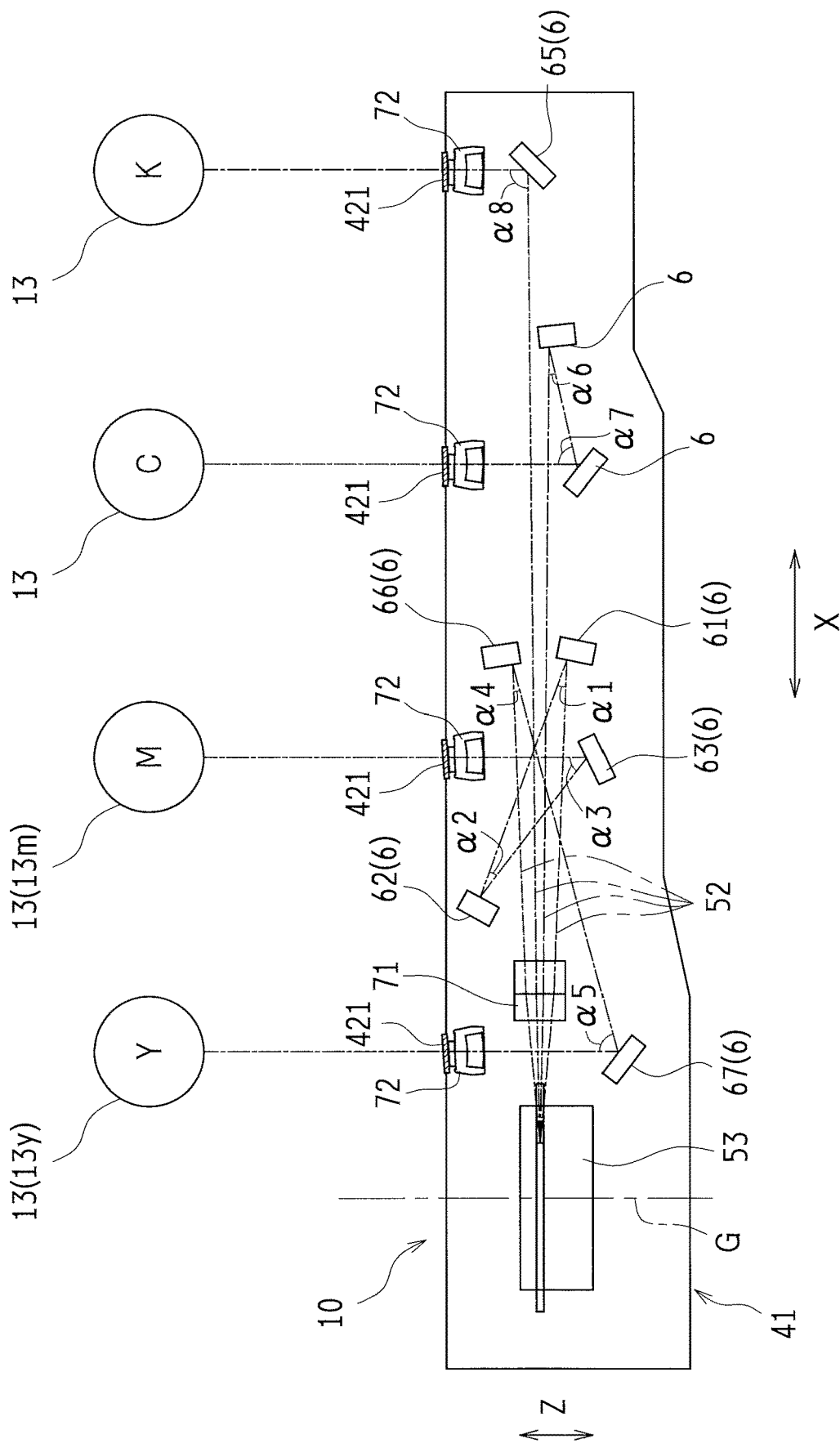
FIG. 5 is an explanatory diagram illustrating a plurality of extracted optical members of the optical scanning device according to Embodiment 1.

Here, among the plurality of optical paths in the optical scanning device 10, the optical path of the light beam 52 for the photosensitive drum 13*m* for magenta color (M) is described. As shown in FIG. 5, on the optical path of the light beam 52 to the photosensitive drum 13*m* for magenta color, the optical scanning device 10 is provided with, as a plurality of reflective mirrors 6: a first reflective mirror 61; a second reflective mirror 62; and a third reflective mirror 63 in this order from the upstream side of the optical path from the polygon mirror 53 to the photosensitive drum 13*m* for magenta color. The second reflective mirror 62 receives the light beam 52 reflected by the first reflective mirror 61. The third reflective mirror 63 receives the light beam 52 reflected by the second reflective mirror 62.

The first fθ lens 71 is provided on the optical path of the laser beam 52 from the polygon mirror 53 to the first reflective mirror 61 that is disposed on the upstream side as the first stage. The second fθ lens 72 is provided on the optical path of the laser beam 52 from the third reflective mirror 63 to the photosensitive drum 13*m* for magenta color. The third reflective mirror 63 is disposed on the downstream side as the last stage.

In the optical scanning device 10 shown in FIG. 4, when the plane that is orthogonal to the rotation center axis G of the polygon mirror 53 and that equally divides each of the reflecting surfaces of the polygon mirror 53 is set as a reference plane L, the first reflective mirror 61 is disposed on the side opposite to the photosensitive drum 13*m* for magenta color relative to the reference plane L. The second reflective mirror 62 is disposed on the side of the photosensitive drum 13*m* for magenta color relative to the reference plane L. The third reflective mirror 63 is disposed on the side opposite to the photosensitive drum 13*m* for magenta color relative to the reference plane L.

As shown in FIG. 5, the first reflective mirror 61, the second reflective mirror 62 and the third reflective mirror 63 are positioned such that the optical path of the light beam 52 to the third reflective mirror 63 as the last stage crosses the optical path to the first reflective mirror 61 as the first stage. The light beam 52 deflected by the polygon mirror 53 enters the first reflective mirror 61 via the first fθ lens 71. The light beam 52 reflected by the first reflective mirror 61 is further reflected by the second reflective mirror 62 and the third reflective mirror 63, and enters the photosensitive drum 13*m* for magenta color via the second fθ lens 72.

The first reflective mirror 61, the second reflective mirror 62 and the third reflective mirror 63 are disposed in the housing 41 such that each angle formed by the incident light and the reflected light of the light beam 52 is an acute angle. In the example shown in FIG. 5, the angle formed by the incident light and the reflected light of the light beam 52 at the first reflective mirror 61 is 10 degrees ($\alpha 1$). It is 17 degrees ($\alpha 2$) at the second reflective mirror 62, and is 53 degrees ($\alpha 3$) at the third reflective mirror 63. Each angle formed by the incident light and the reflected light of the light beam 52 is also an acute angle at the respective reflective mirrors 6 for yellow color (Y), for cyan color (C), and for black color (K). Specifically, the angles are respectively 13 degrees ($\alpha 4$), 74 degrees ($\alpha 5$), 14 degrees ($\alpha 6$), 76 degrees ($\alpha 7$), and 89 degrees ($\alpha 8$).

As shown in FIG. 5, the third reflective mirror 63 is positioned on the extension line of the optical path connecting the photosensitive drum 13*m* for magenta color to the second fθ lens 72. Accordingly, the third reflective mirror 63 and the second fθ lens 72 are positioned, in the housing 41 of the optical scanning device 10, so as to superimpose on each other when viewed from the above. That is, the third reflective mirror 63 and the second fθ lens 72 are disposed such that they have a part superimposed on each other when viewed from the height direction Z along the rotation center axis G.

The first reflective mirror 61 guides the light beam 52 to the second reflective mirror 62. The second reflective mirror 62 guides the light beam 52 to the third reflective mirror 63. In the optical scanning device 10, the first reflective mirror 61 and the second reflective mirror 62 are positioned such that the optical path of the light beam 52 formed between the first reflective mirror 61 and the second reflective mirror 62 crosses the optical path from the third reflective mirror 63 to the second fθ lens 72. Also, the optical path from the third reflective mirror 63 to the second fθ lens 72 crosses the optical path of the light beam 52 from the first fθ lens 71 to the first reflective mirror 61.

The first reflective mirror 61 and the second reflective mirror 62 are positioned such that the optical path of the light beam 52 formed between the first reflective mirror 61 and the second reflective mirror 62 crosses the optical path of the light beam 52 from the third reflective mirror 63 to the second fθ lens 72. Furthermore, the second reflective mirror 62 and the third reflective mirror 63 are positioned such that the optical path of the light beam 52 formed between the second reflective mirror 62 and the third reflective mirror 63 crosses the optical path of the light beam 52 from the first fθ lens 71 to the first reflective mirror 61. Thus, the above-described optical paths intersect with each other.

In the optical scanning device 10, the first reflective mirror 61 is disposed so as to be further away from the polygon mirror 53 in the sub-scanning direction X than the second reflective mirror 62 is. The first reflective mirror 61 is disposed so as to be further away from the polygon mirror 53 in the sub-scanning direction X than the photosensitive drum 13*m* for magenta color (M) is.

In the height direction Z perpendicular to the main-scanning direction Y and also to the sub-scanning direction X, the second reflective mirror 62 is positioned at a height such that the second reflective mirror 62 has a part overlapped with the second fθ lens 72. In the example, the second reflective mirror 62 is disposed such that at least part of the second reflective mirror 62 is overlapped with the second fθ lens 72 in the height direction Z. For example, the second reflective mirror 62 is provided on the side of the photosensitive drum 13 (specifically, the photosensitive drum 13m for magenta color) relative to the reference plane L.

The first reflective mirror 61, the second reflective mirror 62 and the third reflective 63 of the optical scanning device 10, which respectively reflect the light beam 52 deflected by the polygon mirror 53, are positioned according to the rule as described above. Thus, they form the optical path folded several times, which can sufficiently maintain the length of the optical path of the light beam 52 from the first fθ lens 71 to the second fθ lens 72. Furthermore, as shown in FIGS. 4 and 5, the plurality of reflective mirrors 6 can be disposed without having large intervals between each other in the direction along the rotation center axis G of the polygon mirror 53 (in the height direction Z of the optical scanning device 10). Therefore, this configuration can be suitably applied to the optical scanning device 10 to be downsized and thinned, compared to the conventional configurations.

It is already known that, when the optical path fluctuates due to a vibration, density unevenness (jitter or banding) is generated in a formed image. In contrast, this Embodiment has a configuration in which the plurality of reflective mirrors 6 is disposed such that every angle formed by the incident light and the reflected light is an acute angle. Thus, it is possible to prevent generation of vibration so as to reduce banding or the like while reducing curvature (bow) of the scanning lines.

Here, among the plurality of optical paths in the optical scanning device 10, the optical path of the light beam 52 to the photosensitive drum 13 (13y) for yellow color (Y) is described. As shown in FIG. 5, on the optical path of the light beam 52 to the photosensitive drum 13y for yellow color, the optical scanning device 10 is provided with, from the polygon mirror 53 to the photosensitive drum 13y for yellow color: the first reflective mirror 66; and the second reflective mirror 67 that receives the light beam 52 reflected by the first reflective mirror 66. The first fθ lens 71 is provided on the optical path of the laser beam 52 from the polygon mirror 53 to the first reflective mirror 66 as the previous stage. The second fθ lens 72 is provided on the optical path of the laser beam 52 from the second reflective mirror 67 as the following stage to the photosensitive drum 13y for yellow color.

When the plane that is orthogonal to the rotation center axis G of the polygon mirror 53 and that equally divides each of the reflecting surfaces of the polygon mirror 53 is set as a reference plane L, the first reflective mirror 66 is disposed on the side of the photosensitive drum 13y for yellow color relative to the reference plane L (i.e. on the side higher than the reference plane L in the height direction). The second reflective mirror 67 is disposed on the side opposite to the photosensitive drum 13y for yellow color relative to the reference plane L. The first fθ lens 71 is located substantially on the reference plane L.

The first reflective mirror 66 and the second reflective mirror 67 are positioned in the housing 41 such that the optical path of the light beam 52 from the second reflective mirror 67 to the photosensitive drum 13y for yellow color via the second fθ lens 72 crosses the optical path of the light beam 52 from the polygon mirror 53 to the first fθ lens 71. Also, the first reflective mirror 66 and the second reflective mirror 67 are disposed in the housing 41 such that each angle formed by the incident light and the reflected light of the light beam 52 is an acute angle.

As to the optical path of the light beam 52 to the photosensitive drum 13 (13y) for yellow color (Y), the first reflective mirror 66 and the second reflective mirror 67 are positioned according to the rule as described above. Thus, they form the optical path folded several times, which can sufficiently maintain the length of the optical path of the light beam 52 from the first fθ lens 71 to the second fθ lens 72. Furthermore, the first reflective mirror 66 and the second reflective mirror 67 can be disposed without having a large interval between each other in the direction along the rotation center axis G of the polygon mirror 53 (in the height direction Z of the optical scanning device 10). Therefore, this configuration can be suitably applied to the optical scanning device 10 to be downsized and thinned, compared to the conventional configurations.

In this Embodiment, the optical path of the light beam 52 that is guided to the photosensitive drum 13m for magenta color is described. However, the arrangement of the plurality of reflecting mirrors 6 is not limited to that for the photosensitive drum 13m for magenta color, but may be applied to the arrangement for the other photosensitive drums 13.

Embodiment 2

The optical scanning device 10 and the image forming apparatus 1 including the above device 10 according to Embodiment 2 and Embodiment 3 described later have characteristic features in the arrangement of the plurality of reflective mirrors. The basic configurations of the image forming apparatus 1 and the optical scanning device 10 are the same as those in Embodiment 1. Therefore, the reflective mirrors are described in detail here and the other configurations that are the same as those in Embodiment 1 are indicated by the same reference numerals, and the description thereof is omitted. FIGS. 1 and 2 are also used in Embodiments 2 and 3 in common.

Figure 6:
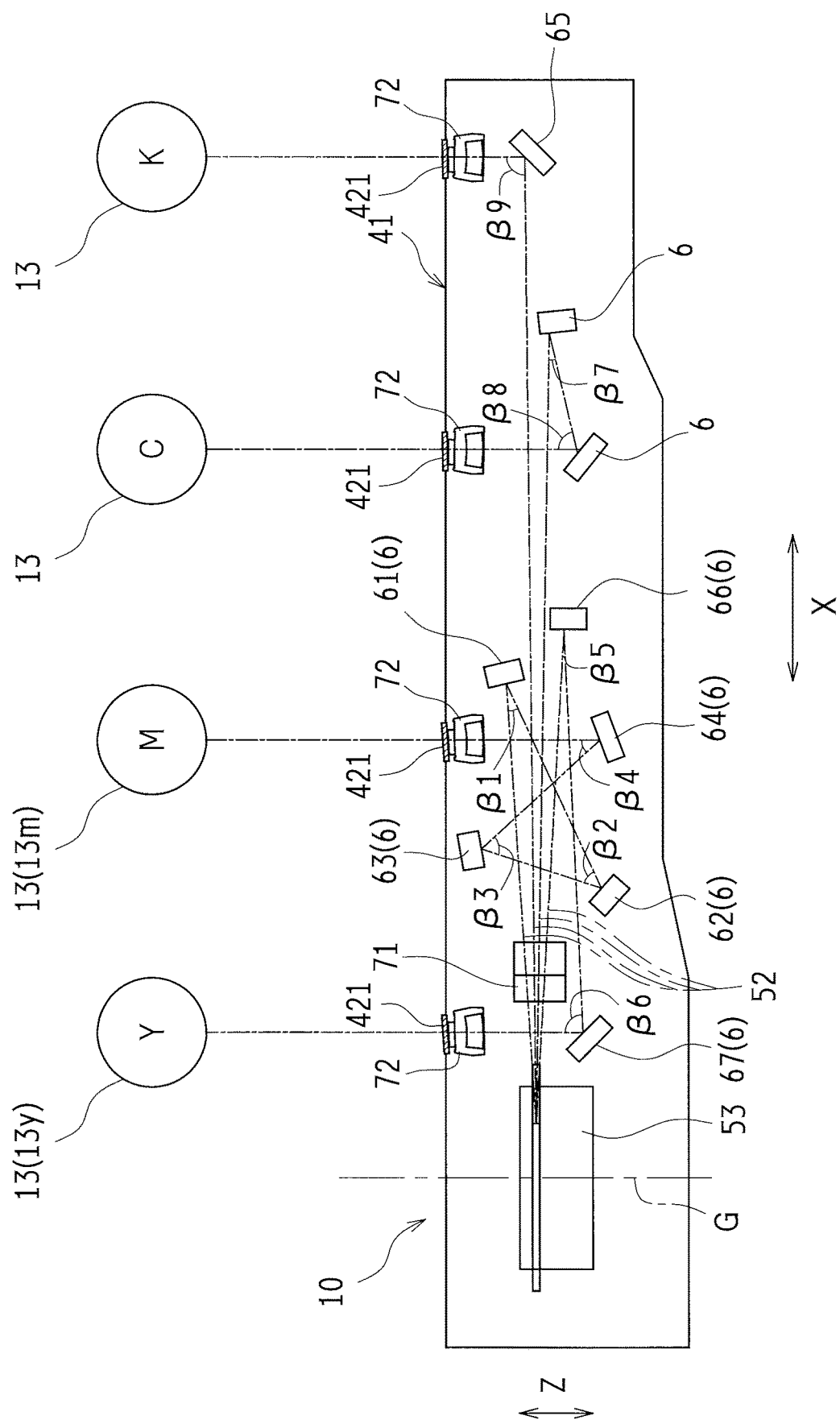
FIG. 6 is an explanatory diagram illustrating a plurality of extracted optical members of an optical scanning device according to Embodiment 2 of the present invention.
Figure 7:
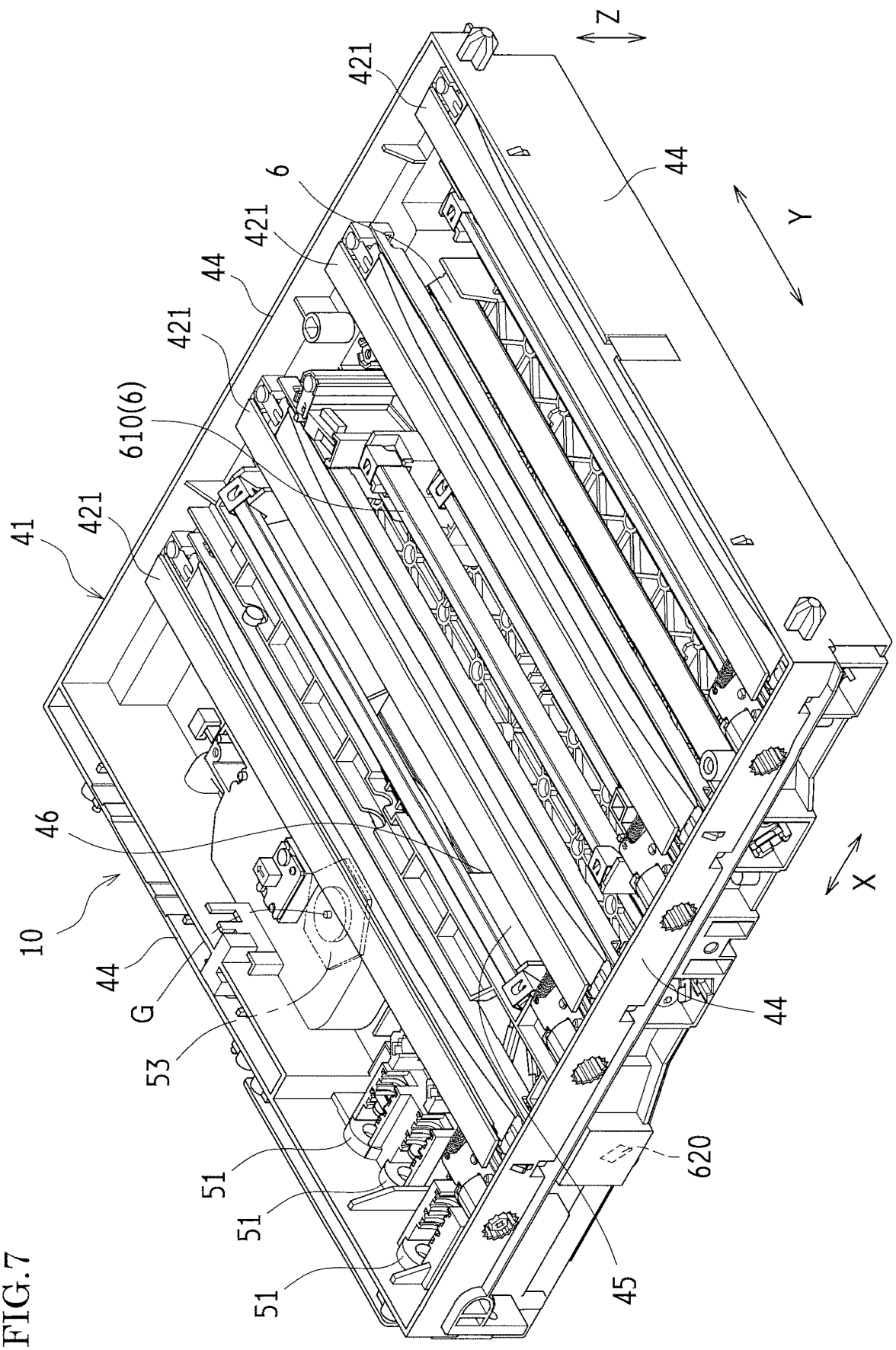
FIG. 7 is a perspective view illustrating the inside of a housing of an optical scanning device according to Embodiment 3, with an upper lid of the housing being removed.

FIG. 6 is an explanatory diagram illustrating a plurality of extracted optical members of the optical scanning device 10 according to Embodiment 2 of the present invention. As shown in FIG. 6, on the optical path of the light beam 52 to the photosensitive drum 13m for magenta color, the optical scanning device 10 is provided with, as the plurality of reflective mirrors 6: the first reflective mirror 61; the second reflective mirror 62; and the third reflective mirror 63 in this order from the upstream side of the optical path from the polygon mirror 53 to the photosensitive drum 13m for magenta color. The second reflective mirror 62 receives the light beam 52 reflected by the first reflective mirror 61. The third reflective mirror 63 receives the light beam 52 reflected by the second reflective mirror 62. In this Embodiment, a fourth reflective mirror 64 is further provided, which receives the light beam 52 reflected by the third reflective mirror 63.

In this case, when the plane that is orthogonal to the rotation center axis G of the polygon mirror 53 and that equally divides each of the reflecting surfaces of the polygon mirror 53 is set as a reference plane, the first reflective mirror 61 and the third reflective mirror 63 are disposed on the side of the photosensitive drum 13m for magenta color relative to the reference plane. The second reflective mirror 62 and the fourth reflective mirror 64 are disposed on the side opposite to the photosensitive drum 13m for magenta color relative to the reference plane.

The light beam 52 deflected by the polygon mirror 53 enters the first reflective mirror 61 via the first fθ lens 71. The plurality of reflective mirrors 6 is positioned such that the optical path of the light beam 52 to the fourth reflective mirror 64 as the last stage crosses the optical path to the first reflective mirror 61 as the first stage. The light beam 52 reflected by the fourth reflective mirror 64 enters the photosensitive drum 13*m* for magenta color via the second fθ lens 72.

The optical path of the light beam 52 from the third reflective mirror 63 to the fourth reflective mirror 64 crosses the optical path from the first reflective mirror 61 to the second reflective mirror 62. Furthermore, the light beam 52 reflected by the fourth reflective mirror 64 crosses the optical path of the light beam 52 from the first reflective mirror 61 to the second reflective mirror 62.

The respective reflective mirrors 61, 62, 63 and 64 are disposed in the housing 41 such that each angle formed by the incident light and the reflected light of the light beam 52 is an acute angle. In the example shown in FIG. 6, the angle formed by the incident light and the reflected light of the light beam 52 at the first reflective mirror 61 is 21 degrees (β1). It is 48 degrees (β2) at the second reflective mirror 62, 59 degrees (β3) at the third reflective mirror 63, and 41 degrees (β4) at the fourth reflective mirror 64.

Each angle formed by the incident light and the reflected light of the light beam 52 is also an acute angle at the respective reflective mirrors 6 for yellow color (Y), for cyan color (C), and for black color (K). Specifically, the angles are respectively 5 degrees (β5), 87 degrees (β6), 14 degrees (β7), 76 degrees (β8), and 89 degrees (β9).

In the optical scanning device 10 according to this Embodiment, the fourth reflective mirror 64 is positioned on the extension line of the optical path connecting the photosensitive drum 13*m* for magenta color to the second fθ lens 72. Accordingly, the fourth reflective mirror 64 and the second fθ lens 72 are positioned, in the housing 41 of the optical scanning device 10, so as to superimpose on each other when viewed from the above. That is, the fourth reflective mirror 64 and the second fθ lens 72 are disposed such that they have a part superimposed on each other when viewed from the height direction Z along the rotation center axis G.

In the optical scanning device 10, the second reflective mirror 62 and the third reflective mirror 63 are positioned such that the optical path of the light beam 52 formed between the second reflective mirror 62 and the third reflective mirror 63 crosses the optical path of the light beam 52 from the first fθ lens 71 to the first reflective mirror 61. Also, the fourth reflective mirror 64 is positioned such that the optical path of the light beam 52 formed between the third reflective mirror 63 and the fourth reflective mirror 64 crosses the optical path of the light beam 52 from the first fθ lens 71 to the first reflective mirror 61.

Furthermore, the first reflective mirror 61 and the second reflective mirror 62 are positioned such that the optical path of the light beam 52 formed between the first reflective mirror 61 and the second reflective mirror 62 crosses the optical path of the light beam 52 from the fourth reflective mirror 64 to the second fθ lens 72. Thus, the above-described optical paths intersect with each other.

In the height direction Z perpendicular to the main-scanning direction Y and also to the sub-scanning direction X, the third reflective mirror 63 is positioned at a height such that the third reflective mirror 63 has a part overlapped with the second fθ lens 72. In the example, the third reflective mirror 63 is disposed such that at least part of the third reflective mirror 63 is overlapped with the second fθ lens 72 in the height direction Z. For example, the third reflective mirror 63 is provided on the side of the photosensitive drum 13 (specifically, the photosensitive drum 13*m* for magenta color) relative to the reference plane L.

In the optical scanning device 10, the light beams 52 are smoothly guided to the respective photosensitive drums 13 by the plurality of reflective mirrors 6 positioned as described above, and the photosensitive drums 13 are respectively scanned with the light beams 52. Also, the scanning timing of each photosensitive drum 13 with the light beam is set according to detection timing of the light beam 52.

In the optical scanning device 10 according to Embodiment 2, similarly to Embodiment 1, it is possible to sufficiently maintain the length of the optical path of the light beam 52 while compactly installing the plurality of reflective mirrors 6 in the housing 41. Therefore, this configuration can be suitably applied to the optical scanning device 10 and the image forming apparatus 1 including the optical scanning device 10, which are downsized and thinned. Also, it is possible to form a high-quality image.

In the optical scanning device 10 according to Embodiment 1 and Embodiment 2, the number to e installed of the reflective mirrors 6 that reflect and guide the light beams 52 to the respective photosensitive drums 13 is not limited to the number indicated in Embodiment 1 and Embodiment 2. The optical scanning device 10 may include more reflective mirrors. Also, the arrangement of the respective reflective mirrors 6 is not limited to the examples shown in FIGS. 5 and 6. Any arrangement can be applied provided that the first reflective mirror 61, the second reflective mirror 62 and the third reflective mirror 63 are positioned such that the optical path of the light beam 52 reflected by the third reflective mirror 63 crosses the optical path between the first reflective mirror 61 and the second reflective mirror 62.

Embodiment 3

The optical scanning device 10 according to Embodiment 3 is described with reference to FIGS. 7 to 10. Here, among the plurality of optical paths in the optical scanning device 10, the optical path of the light beam 52 to the photosensitive drum 13*y* for yellow color (Y) is described.

Figure 9:
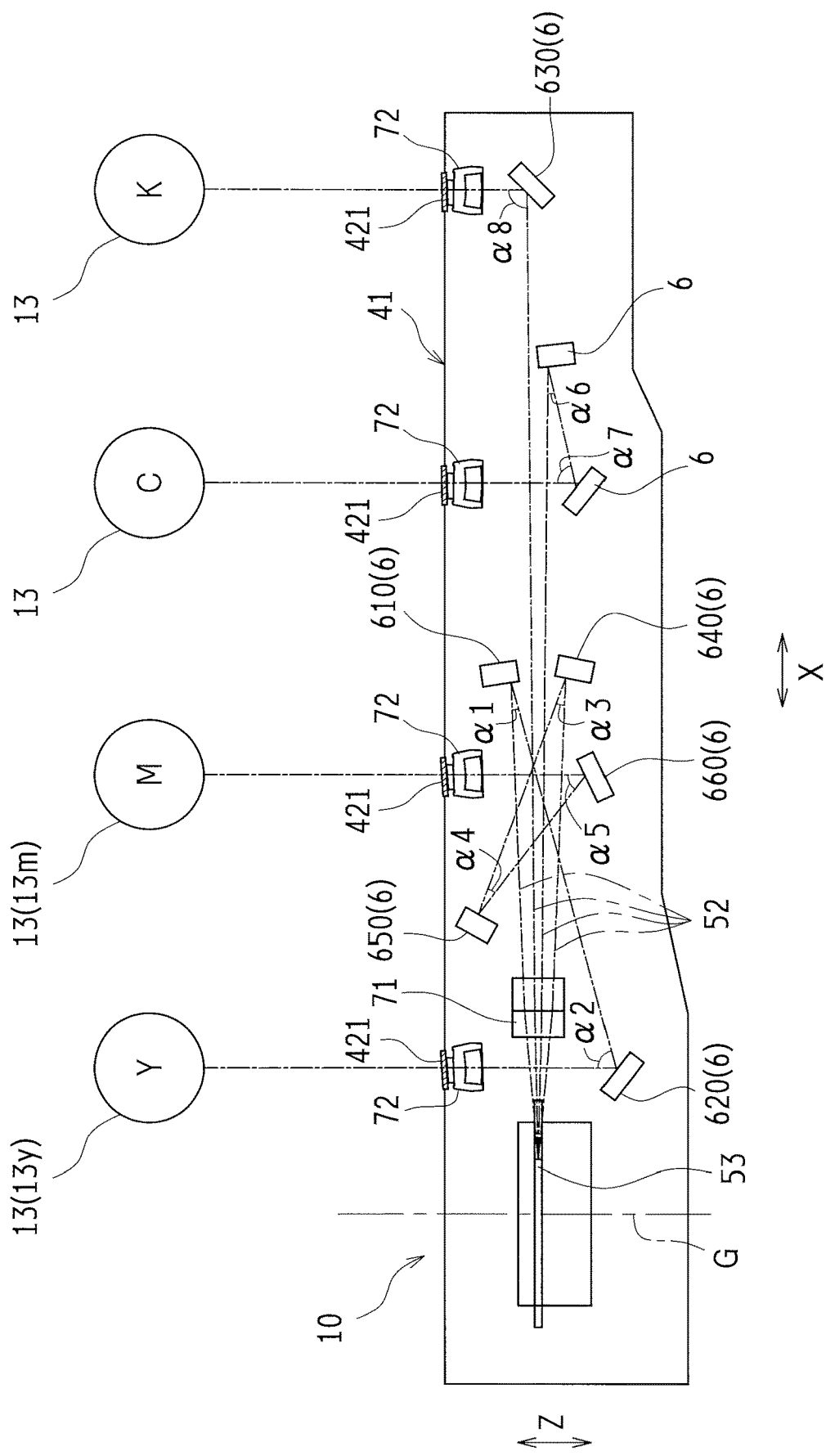
FIG. 9 is an explanatory diagram schematically illustrating a plurality of extracted optical members of the above-described optical scanning device.

As shown in FIG. 9, on the optical path of the light beam 52 to the photosensitive drum 13*y* for yellow color, the optical scanning device 10 is provided with a plurality of reflective mirrors 6 from the polygon mirror 53 to the photosensitive drum 13*y* for yellow color. More specifically, the optical scanning device 10 includes a first reflective mirror 610 and a second reflective mirror 620 that receives the light beam 52 reflected by the first reflective mirror 610 in this order on the optical path from the polygon mirror 53 to the photosensitive drum 13*y*.

The first fθ lens 71 is provided on the optical path of the laser beam 52 from the polygon mirror 53 to the first reflective mirror 610 at the uppermost stream. The second fθ lens 72 is provided on the optical path of the laser beam 52 from the second reflective mirror 620 at the lowermost stream to the photosensitive drum 13*y* for yellow color.

Figure 8:
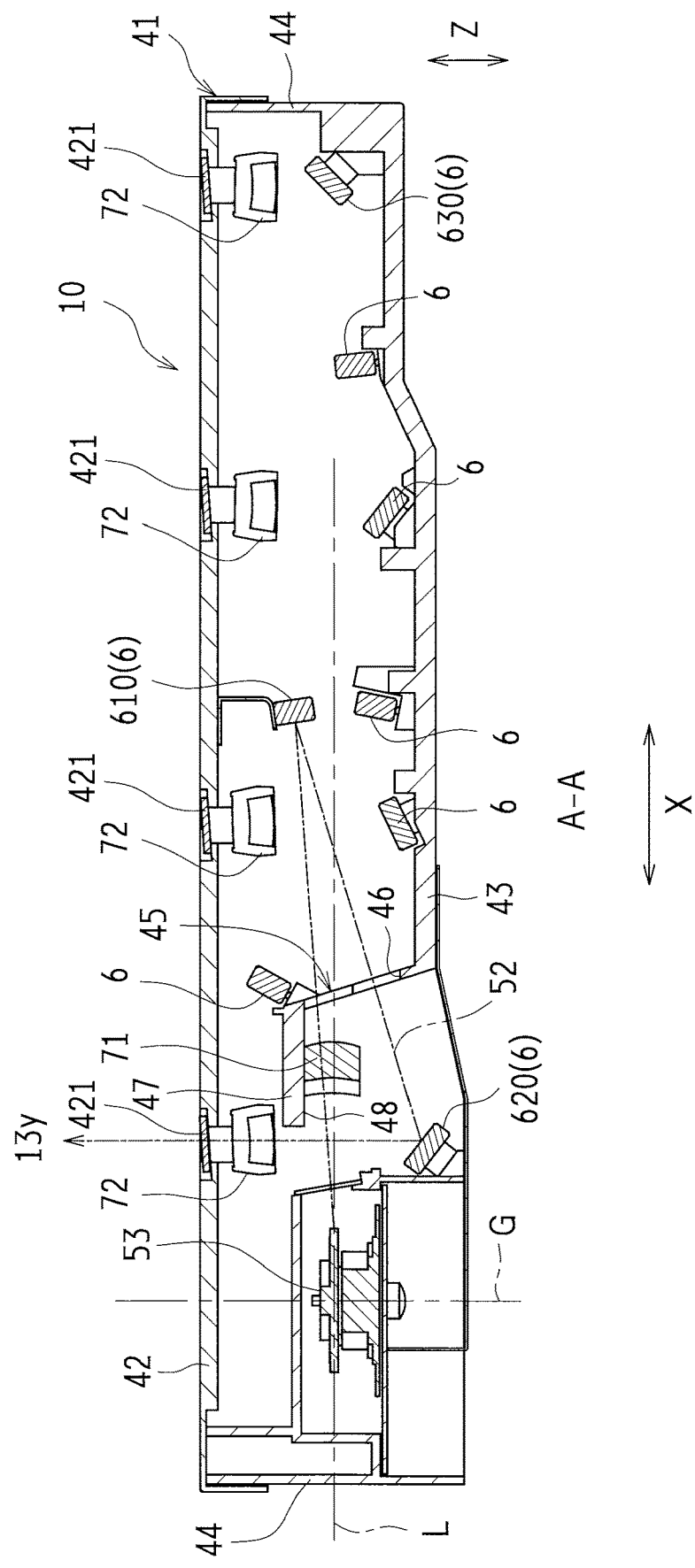
FIG. 8 is an explanatory diagram illustrating an arrangement of the optical members of the above-described optical scanning device, which is taken from line A-A of FIG. 2.

In the optical scanning device 10 as shown in FIG. 8, when the plane that is orthogonal to the rotation center axis G of the polygon mirror 53 and that equally divides each of the reflecting surfaces of the polygon mirror 53 is set as a reference plane L, the first reflective mirror 610 is disposed on the side of the photosensitive drum 13*y* for yellow color relative to the reference plane L. Alternatively, the reference plane L may be a plane that is orthogonal to the rotation center axis G of the polygon mirror 53 and that includes the optical path of the light beam 52 to a reflective mirror 630 for black color (K), which allows the light beam 52 from the polygon mirror 53 to enter the photosensitive drum 13 for black color (K). The reflective mirror 630 for black color (K) is disposed at the farthest position from the polygon mirror 53.

The second reflective mirror 620 is disposed on the side opposite to the photosensitive drum 13*y* for yellow color relative to the reference plane L. The first fθ lens 71 is located substantially on the reference plane L.

The polygon mirror 53 is disposed close to one side in the housing 41 in the sub-scanning direction X. The housing 41 includes an inner wall 45 erected from the bottom plate 43 toward the upper lid 42. In this example, the inner wall 45 is disposed between the first reflective mirror 610 and the second reflective mirror 620, and furthermore disposed so as to incline from the side of the first reflective mirror 610 to the side of the polygon mirror 53.

The inner wall 45 includes, at an upper end thereof, a support plate 47 that extends toward the polygon mirror 53 (in the sub-scanning direction X). The support plate 47 is disposed on the side of the photosensitive drum 13*y* for yellow color relative to the reference plane L. Also, the support plate 47 extends in the sub-scanning direction X within the range between the position below (but not contacting with) the second fθ lens 72 corresponding to the photosensitive drum 13*y* for yellow color and a second fθ lens 72 corresponding to the photosensitive drum 13*m* for magenta color. An upper surface of the support plate 47 faces the upper lid 42 while a rear surface 48 of the support plate 47 faces the bottom plate 43.

The inner wall 45 is provided in the housing 41 in the main-scanning direction Y while it is provided, in the sub-scanning direction X, between the second fθ lens 72 for the photosensitive drum 13*y* for yellow color and the second fθ lens 72 for the photosensitive drum 13*m* for magenta color. In the inner wall 45, an opening 46 is formed so as to penetrate the inner wall 45 in the sub-scanning direction X.

Figure 10:
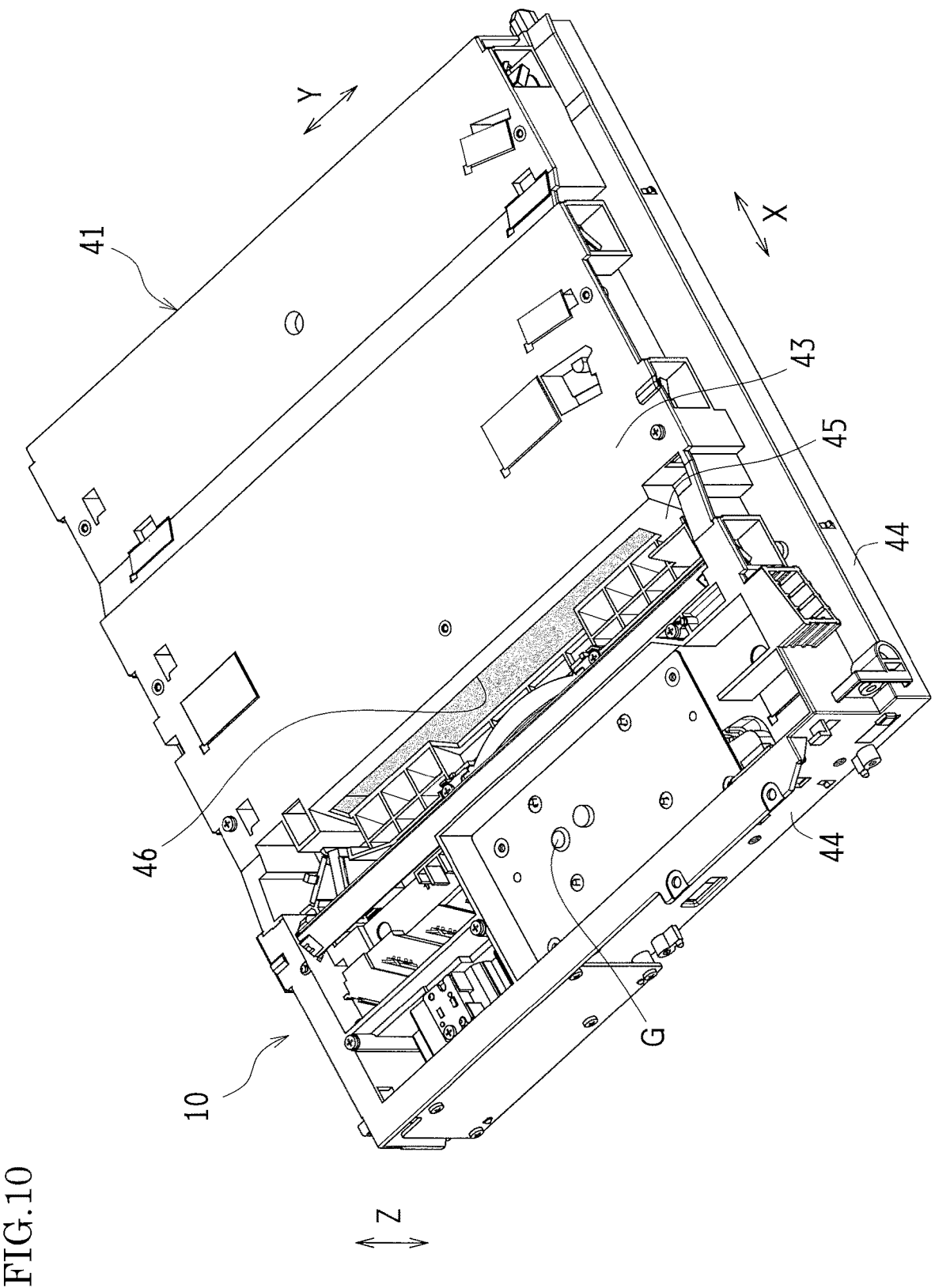
FIG. 10 is a perspective view illustrating a rear surface of the housing of the above-described optical scanning device, viewed from the outside.

In FIG. 10, the area of the opening 46 is shown in gray color. As shown in FIGS. 8 and 10, the opening 46 has a long size in the main-scanning direction Y of the inner wall 45. Also, the opening 46 has a larger size in the height direction Z at the substantial center part in the main-scanning direction Y, which extends from the side of the bottom plate 43 to the side of the support plate 47. Also, the opening 46 has a smaller size in the height direction Z at both end parts in the main-scanning direction Y, the size of which is about half the opening height at the substantial center part. These smaller size end parts of the opening 46 are formed on the side of the bottom plate 43.

The first fθ lens 71 is fixed to the support plate 47 extending from the inner wall 45, and emits the light beams 52 such that the light beams 52 have a predetermined beam diameter on the surfaces of the respective photosensitive drums 13. The first fθ lens 71 is attached to the rear surface 48 of the support plate 47.

Thus, the first fθ lens 71 is provided on the reference plane L, and hung and supported by the support plate 47. In the housing 41, no element exists between the first fθ lens 71 and the bottom plate 43. Also, since the opening 46 has a large size in the height direction Z at the substantial center part in the main-scanning direction Y, the light beam 52 from the first fθ lens 71 can smoothly reach the first reflective mirror 610 that is disposed on the side of the photosensitive drum 13*y* for yellow color relative to the reference plane L.

Here, the first reflective mirror 610 and the second reflective mirror 620 are provided in the housing 41 such that the optical path of the light beam 52 from the second reflective mirror 620 to the second fθ lens 72 crosses the optical path of the light beam 52 from the polygon mirror 53 to the first fθ lens 71.

The first reflective mirror 610 and the second reflective mirror 620 are disposed in the housing 41 such that each angle formed by the incident light and the reflected light of the light beam 52 is an acute angle. In the example shown in FIG. 9, regarding the light beam 52 that enters the photosensitive drum 13*y* for yellow color, the angle formed by the incident light and the reflected light of the light beam 52 at the first reflective mirror 610 is 13 degrees (α1). It is 74 degrees (α2) at the second reflective mirror 610.

As shown in FIG. 8, the light beam 52 deflected by the polygon mirror 53 enters the first reflective mirror 610 via the first fθ lens 71. The light beam 52 that passes through the first fθ lens 71 further passes through the opening 46 of the inner wall 45, thus reaches the first reflective mirror 610.

The light beam 52 reflected by the first reflective mirror 610 passes through the opening 46 of the inner wall 45 to be guided to the second reflective mirror 620. The optical path of the light beam 52 from the first reflective mirror 610 to the second reflective mirror 620 is formed below the first fθ lens 71. Since the first fθ lens 71 is supported by the support plate 47 that is integrally formed with the inner wall 45, there is no obstacle below the first fθ lens 71. Therefore, the light beam 52 is smoothly guided to the second reflective mirror 620.

Further, the light beam 52 from the first reflective mirror 610 is reflected by the second reflective mirror 620, and crosses the optical path of the light beam 52 from the polygon mirror 53 to the first fθ lens 71 to pass through the second fθ lens 72. Thus, the light beam 52 is guided to the photosensitive drum 13*y* for yellow color.

The second reflective mirror 620 is positioned on the extension line of the optical path connecting the photosensitive drum 13*y* for yellow color to the second fθ lens 72. Accordingly, the second reflective mirror 620 is positioned, in the housing 41 of the optical scanning device 10, so as to superimpose on the second fθ lens 72 when viewed from the above.

The first reflective mirror 610 receives the light beam 52 deflected by the polygon mirror 53 via the first fθ lens 71. Also, the first reflective mirror 610 reflects the light beam 52 to guide the light beam 52 to the second reflective mirror 620.

In the optical scanning device 10, the first reflective mirror 610 is disposed so as to be further away from the polygon mirror 53 in the sub-scanning direction X than the second reflective mirror 620 is. Furthermore, the first reflective mirror 610 is disposed so as to be further away from the polygon mirror 53 in the sub-scanning direction X than the photosensitive drum 13*m* for magenta color (M) is. The photosensitive drum 13*m* for magenta color is positioned adjacent to the photosensitive drum 13*y* for yellow color in the sub-scanning direction X.

In the height direction Z perpendicular to the main-scanning direction Y and also to the sub-scanning direction X, the first reflective mirror 610 is positioned at a height such that the first reflective mirror 610 has a part overlapped with the second fθ lens 72. In the example, the first reflective mirror 610 is disposed such that at least part of the first reflective mirror 610 is overlapped with the second fθ lens 72 in the height direction Z. For example, the first reflective mirror 610 is provided on the side of the photosensitive drum 13 (specifically, the photosensitive drum 13*m* for magenta color) relative to the reference plane L.

Thus, the first reflective mirror 610 is positioned such that the optical path of the light beam 52 from the first reflective mirror 610 to the second reflective mirror 620 crosses the optical path of the light beam 52 guided to the photosensitive drum 13*m* for magenta color. These optical paths intersect with each other in the housing 41.

The first reflective mirror 610 and the second reflective mirror 620 in the optical scanning device 10, which reflect the light beam 52 deflected by the polygon mirror 53, are positioned according to the rule as described above. Thus, they form the optical path folded several times, which can sufficiently maintain the length of the optical path of the light beam 52 from the first fθ lens 71 to the second fθ lens 72. Furthermore, as shown in FIGS. 8 and 9, the first reflective mirror 610 and the second reflective mirror 620 can be disposed without having a large interval between each other in the direction along the rotation center axis G of the polygon mirror 53 (in the height direction Z of the optical scanning device 10). Therefore, this configuration can be suitably applied to the optical scanning device 10 to be downsized and thinned, compared to the conventional configurations.

Even when the first reflective mirror 610 and the second reflective mirror 620 are provided at a narrow interval in the height direction Z of the optical scanning device 10, it is possible to smoothly form the optical path of the light beam 52 because the first fθ lens 71 is fixed to the rear surface 48 of the support plate 47.

Meanwhile, it is already known that, when the optical path fluctuates due to a vibration, density unevenness (jitter or banding) is generated in a formed image. In contrast, this Embodiment has a configuration in which the plurality of reflective mirrors 6 (610 and 620) is disposed such that every angle formed by the incident light and the reflected light is an acute angle. Thus, it is possible to prevent generation of vibration, which leads to reduction of banding or the like while reducing curvature (bow) of the scanning lines.

Here, among the plurality of optical paths in the optical scanning device 10, the optical path of the light beam 52 for the photosensitive drum 13*m* for magenta color (M) is described. As shown in FIG. 9, on the optical path of the light beam 52 to the photosensitive drum 13*m* for magenta color, the optical scanning device 10 is provided with, as a plurality of reflective mirrors 6: a first reflective mirror 640; a second reflective mirror 650; and a third reflective mirror 660 in this order on the optical path from the polygon mirror 53 to the photosensitive drum 13*m* for magenta color. The second reflective mirror 650 receives the light beam 52 reflected by the first reflective mirror 640. The third reflective mirror 660 receives the light beam 52 reflected by the second reflective mirror 650.

The second reflective mirror 650 is disposed on the side of the photosensitive drum 13*m* for magenta color relative to the reference plane L. The third reflective mirror 660 is disposed on the side opposite to the photosensitive drum 13*m* for magenta color relative to the reference plane L.

The first reflective mirror 640, the second reflective mirror 650 and the third reflective mirror 660 are positioned such that the optical path of the light beam 52 to the third reflective mirror 660 at, the lowermost stream crosses the optical path to the first reflective mirror 640 at the uppermost stream. The light beam 52 deflected by the polygon mirror 53 enters the first reflective mirror 640 via the first fθ lens 71. The light beam 52 reflected by the first reflective mirror 640 is further reflected by the second reflective mirror 650 and the third reflective mirror 660, and enters the photosensitive drum 13*m* for magenta color via the second fθ lens 72.

The first reflective mirror 640, the second reflective mirror 650 and the third reflective mirror 660 are disposed in the housing 41 such that each angle formed by the incident light and the reflected light of the light beam 52 is an acute angle. As to the light beams 52 to enter the other photosensitive drums 13, the respective reflective mirrors 6 are disposed such that every angle formed by the incident light and the reflected light of the light beam 52 at the reflective mirror 6 is an acute angle.

That is, as shown in FIG. 9, the angle formed by the incident light and the reflected light of the light beam 52 is an acute angle. At the respective reflective mirrors 6 for the photosensitive drum 13*m* for magenta color (M), the angles are respectively 10 degrees (α3), 17 degrees (α4), and 53 degrees (α5). At the respective reflective mirrors 6 for the photosensitive drum 13 for cyan color (C), the angles are respectively 14 degrees (α6) and 76 degrees (α7). At the mirror 6 for the photosensitive drum 13 for black color (K), the angle is 89 degrees (α8).

The plurality of reflective mirrors 6 of the optical scanning device 10, which respectively reflects the light beam 52 deflected by the polygon mirror 53, is positioned according to the rule as described above. Thus, they form the optical path folded several times, which can sufficiently maintain the length of the optical path of the light beam 52 from the first fθ lens 71 to the second fθ lens 72. Furthermore, the plurality of reflective mirrors 6 can be disposed without having large intervals between each other in the direction along the rotation center axis G of the polygon mirror 53 (in the height direction Z of the optical scanning device 10). Therefore, this configuration can be suitably applied to the optical scanning device 10 to be downsized and thinned, compared to the conventional configurations.

In the optical scanning device 10 according to the present invention, the number to be installed of the reflective mirrors 6 that reflect and guide the light beams 52 to the respective photosensitive drums 13 is not limited to the number indicated in this Embodiment. The optical scanning device 10 may include more reflective mirrors.

Also inn this Embodiment, the optical path of the light beam 52 that is guided to the photosensitive drum 13*y* for yellow color is described. However, the arrangement of the plurality of reflecting mirrors 6 is not limited to that for the photosensitive drum 13*y* for yellow color, but may be applied to the arrangement for the other photosensitive drums 13. Also, the arrangement of the respective reflective mirrors 6 is not limited to the examples shown in FIGS. 8 and 9. Any arrangement can be applied provided that the respective reflective mirrors 6 are provided such that the optical path of the light beam 52 from the second reflective mirror 620 to the second fθ lens 72 crosses the optical path of the light beam 52 from the polygon mirror 53 to the first fθ lens 71.

The present invention may be embodied in other forms without departing from the gist or essential characteristics thereof. The foregoing embodiment is therefore to be considered in all respects as illustrative and not limiting. The scope of the invention is indicated by the appended claims rather than by the foregoing description, and all modifications and changes that come within the meaning and range of equivalency of the claims are intended to be embraced therein.

What is claimed is:

1. An optical scanning device deflecting a light beam emitted from a light source and scanning scan objects with the light beam, the optical scanning device comprising:
    the light source;

a deflecting section deflecting the light beam emitted from the light source;

at least three reflective mirrors reflecting the light beam deflected by the deflecting section so as to guide the light beam to a specific one of the scan objects; and a first optical member provided on an optical path of the light beam from the deflecting section to one of the at least three reflective mirrors, the first optical member having condensing characteristics, wherein when the at least three reflective mirrors are set as a first reflective mirror, a second reflective mirror and a third reflective mirror in this order from an upstream side of the optical path of the light beam, the first reflective mirror, the second reflective mirror and the third reflective mirror are positioned such that the optical path of the light beam reflected by the third reflective mirror crosses the optical path between the first reflective mirror and the second reflective mirror, a second optical member that has condensing characteristics is provided on the optical path of the light beam from the third reflective mirror to the specific scan object, the optical path of the light beam that enters the second optical member crosses the optical path of the light beam from the first optical member to the first reflective mirror and the optical path between the first reflective mirror and the second reflective mirror, and a fourth reflective mirror that receives the light beam reflected by the third reflective mirror is provided on the optical path of the light beam.

2. The optical scanning device according to claim 1, wherein the first reflective mirror, the second reflective mirror and the third reflective mirror are provided on the optical path, and the light beam enters the first reflective mirror via the first optical member, the second reflective mirror receives the light beam reflected by the first reflective mirror, and the third reflective mirror receives the light beam reflected by the second reflective mirror.

3. The optical scanning device according to claim 1, wherein the optical path of the light beam reflected by the third reflective mirror crosses the optical path of the light beam from the first optical member to the first reflective mirror.

4. The optical scanning device according to claim 1, wherein the at least three reflective mirrors are provided such that each angle formed by an incident light and a reflected light of the light beam at each of the reflective mirrors is an acute angle.

5. The optical scanning device according to claim 1, wherein when a plane that is orthogonal to a rotation center axis of the deflecting section and that equally divides each of reflecting surfaces of the deflecting section is set as a reference plane, or when a plane that is orthogonal to the rotation center axis of the deflecting section and that includes the optical path of the light beam between the deflecting section and the reflective mirror at the farthest position from the deflecting section is set as a reference plane, the second reflective mirror is disposed on a side of the specific scan object relative to the reference plane while the first reflective mirror and the third reflective mirror are disposed on a side opposite to the specific scan object relative to the reference plane.

6. The optical scanning device according to claim 1, wherein the second reflective mirror is disposed such that at least part of the second reflective mirror is overlapped with the second optical member in a height direction perpendicular to a main-scanning direction and also to a sub-scanning direction.

7. The optical scanning device according to claim 1, wherein when a plane that is orthogonal to a rotation center axis of the deflecting section and that equally divides each of reflecting surfaces of the deflecting section is set as a reference plane, or when a plane that is orthogonal to the rotation center axis of the deflecting section and that includes the optical path of the light beam between the deflecting section and the reflective mirror at the farthest position from the deflecting section is set as a reference plane, the first reflective mirror and the third reflective mirror are disposed on a side of the specific scan object relative to the reference plane while the second reflective mirror and the fourth reflective mirror are disposed on a side opposite to the specific scan object relative to the reference plane.

8. The optical scanning device according to claim 1, wherein the third reflective mirror is disposed such that at least part of the third reflective mirror is overlapped with the second optical member in a height direction perpendicular to a main-scanning direction and also to a sub-scanning direction.

9. An optical scanning device deflecting a light beam emitted from a light source and scanning scan objects with the light beam, the optical scanning device comprising:

the light source;

a deflecting section deflecting the light beam emitted from the light source;

a plurality of reflective mirrors reflecting the light beam deflected by the deflecting section so as to guide the light beam to a specific one of the scan objects;

a first optical member provided on an optical path of the light beam from the deflecting section to a first reflective mirror among the plurality of reflective mirrors, the first optical member having condensing characteristics; and a housing having an upper opening that is closed by an upper lid, wherein the housing includes a bottom plate, a support member that supports the first optical member, and a connecting member that connects the bottom plate to the support member, the plurality of reflective mirrors is positioned such that the optical path of the light beam from a second reflective mirror disposed downstream of the first reflective mirror on the optical path of the light beam to the specific scan object crosses the optical path of the light beam from the deflecting section to the first optical member, the connecting member is provided with an opening, and the light beam reflected by the first reflective mirror passes through the opening so as to be guided to the second reflective mirror.

10. The optical scanning device according to claim 9, wherein the first reflective mirror and the second reflective mirror are provided on the optical path, and the light beam enters the first reflective mirror via the first optical member, and the second reflective mirror receives the light beam reflected by the first reflective mirror.

11. The optical scanning device according to claim 9, wherein
a second optical member that has condensing characteristics is provided on the optical path of the light beam from the second reflective mirror to the specific scan object, and
the light beam that passes through the second optical member is guided to the specific scan object.

12. The optical scanning device according to claim 11, wherein
the first reflective mirror is disposed such that at least part of the first reflective mirror is overlapped with the second optical member in a height direction perpendicular to a main-scanning direction and also to a sub-scanning direction.

13. The optical scanning device according to claim 9, wherein
the specific scan object is disposed in a position closer to the deflecting section in the sub-scanning direction than the other scan objects.

14. The optical scanning device according to claim 9, wherein
the plurality of reflective mirrors is provided such that each angle formed by an incident light and a reflected light of the light beam at each of the plurality of reflective mirrors is an acute angle.

15. The optical scanning device according to claim 9, wherein
a second optical member that has condensing characteristics is provided on the optical path of the light beam from the second reflective mirror to the specific scan object, and
the second reflective mirror out of the plurality of reflective mirrors is positioned on an extension line of the optical path connecting the specific scan object to the second optical member.

16. The optical scanning device according to claim 9, wherein
when a plane that is orthogonal to a rotation center axis of the deflecting section and that equally divides each of reflecting surfaces of the deflecting section is set as a reference plane, or when a plane that is orthogonal to the rotation center axis of the deflecting section and that includes the optical path of the light beam between the deflecting section and the reflective mirror at the farthest position from the deflecting section is set as a reference plane, the first reflective mirror is disposed on a side of the specific scan object relative to the reference plane while the second reflective mirror is disposed on a side opposite to the specific scan object relative to the reference plane.

17. An image forming apparatus comprising the optical scanning device according to claim 1, wherein
the image forming apparatus forms latent images respectively on the scan objects by the optical scanning device, develops the latent images on the scan objects as visible images, and transfers the visible images from the scan objects to a sheet to form an image on the sheet.

18. An image forming apparatus comprising the optical scanning device according to claim 9, wherein
the image forming apparatus forms latent images respectively on the scan objects by the optical scanning device, develops the latent images on the scan objects as visible images, and transfers the visible images from the scan objects to a sheet to form an image on the sheet.

* * * * *